(12) United States Patent
Gilar et al.

(10) Patent No.: US 11,061,003 B2
(45) Date of Patent: Jul. 13, 2021

(54) METHOD AND APPARATUS FOR INJECTING A CHROMATOGRAPHIC SAMPLE

(71) Applicant: Waters Technologies Corporation, Milford, MA (US)

(72) Inventors: Martin Gilar, Franklin, MA (US); Keith Fadgen, Hope Valley, RI (US); Peyton C. Beals, Wrentham, MA (US); Sylvain Gilles Cormier, Mendon, MA (US); Richard Wayne Andrews, Rehoboth, MA (US); Geoff C. Gerhardt, Woonsocket, RI (US); Jordan Kornfeld, Norfolk, MA (US); Thomas S. McDonald, Holden, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 16/601,860

(22) Filed: Oct. 15, 2019

(65) Prior Publication Data
US 2020/0041463 A1 Feb. 6, 2020

Related U.S. Application Data

(63) Continuation-in-part of application No. 16/098,280, filed as application No. PCT/US2017/030950 on May 4, 2017.

(Continued)

(51) Int. Cl.
*G01N 30/06* (2006.01)
*G01N 30/20* (2006.01)

(52) U.S. Cl.
CPC .............. *G01N 30/06* (2013.01); *G01N 30/20* (2013.01)

(58) Field of Classification Search
CPC ......... G01N 30/04; G01N 30/16; G01N 30/24
See application file for complete search history.

(56) References Cited

U.S. PATENT DOCUMENTS

| 4,004,884 A | 1/1977 | Zdrodowski |
| 2012/0103075 A1 | 5/2012 | Cormier et al. |

(Continued)

FOREIGN PATENT DOCUMENTS

| CN | 1675530 A | 9/2005 |
| CN | 102333954 A | 1/2012 |

(Continued)

OTHER PUBLICATIONS

International Search Report and Written Opinion in PCT/US2017/030950 dated Sep. 7, 2017; 7 pages.

(Continued)

*Primary Examiner* — Walter L Lindsay, Jr.
*Assistant Examiner* — Andrew V Do
(74) *Attorney, Agent, or Firm* — Schmeiser, Olsen & Watts LLP; William G. Guerin

(57) ABSTRACT

Described are a method and apparatus for diluting a chromatographic sample. The method includes repeating an alternating acquisition of sample fluidic plugs each having an incremental volume of sample and diluent fluidic plugs each having an incremental volume of diluent to obtain a stack of alternating sample and diluent fluidic plugs. The stack is inserted into a flow of a mobile phase in a chromatography system. Alternatively, the method includes repeating the steps of injecting an incremental volume of sample into a chromatographic system flow and providing an incremental volume of mobile phase into the chromatographic system flow. In either implementation, the dilution ratio of the sample equals the sum of the incremental volumes of the (Continued)

sample and the diluent or mobile phase divided by the sum of the incremental volumes of the sample.

13 Claims, 12 Drawing Sheets

Related U.S. Application Data

(60) Provisional application No. 62/332,069, filed on May 5, 2016.

(56) References Cited

U.S. PATENT DOCUMENTS

| | | | |
|---|---|---|---|
| 2012/0305464 A1 | 12/2012 | Cormier | |
| 2013/0134095 A1* | 5/2013 | Anderer | G01N 30/463 210/656 |
| 2015/0377843 A1 | 12/2015 | Morikawa et al. | |
| 2016/0077060 A1 | 3/2016 | Cormier et al. | |

FOREIGN PATENT DOCUMENTS

| | | |
|---|---|---|
| CN | 103940941 A | 7/2014 |
| CN | 104813170 A | 7/2015 |
| CN | 104897820 A | 9/2015 |
| EP | 2993471 A1 | 3/2016 |
| WO | 2009111229 A2 | 9/2009 |

OTHER PUBLICATIONS

International Preliminary Report on Patentability in PCT/US2017/030950 dated Nov. 15, 2018; 6 pages.
Gilar, et al. "Repetitive injection method: A tool for investigation of injection zone formation and its compression in microfluidic liquid chromatography," Journal of Chromatography A, Jan. 9, 2015, pp. 110-117, vol. 1381.
Gilar, et al. "Wide injection zone compression in gradient reversed-phase liquid chromatography," Journal of Chromatography A, Feb. 23, 2015, pp. 86-94, vol. 1390.
Extended Search Report in European Patent Application No. 17793301.7 dated Nov. 19, 2019; 7 pages.
Non-Final Office Action in U.S. Appl. No. 16/098,280 dated Feb. 5, 2021.
Non-Final Office Action in U.S. Appl. No. 16/098,280 dated Aug. 13, 2020.

* cited by examiner

METHOD AND APPARATUS FOR INJECTING A CHROMATOGRAPHIC SAMPLE

CROSS-REFERENCE TO RELATED APPLICATIONS

This application is a continuation-in-part of U.S. patent application Ser. No. 16/098,280, which entered the U.S. national stage Nov. 1, 2018 as the U.S. national phase application of PCT international application no. PCT/US2017/030950, filed May 4, 2017, which claims priority from U.S. provisional patent application No. 62/332,069, filed May 5, 2016. The entireties of these applications are incorporated herein by reference.

FIELD OF THE INVENTION

The invention relates generally to sample injections for liquid chromatography systems. More particularly, the invention relates to a method and apparatus for injecting a large volume of a sample dissolved in a strong chromatographic solvent.

BACKGROUND

Chromatography is a set of techniques for separating a mixture into its constituents. For instance, in a liquid chromatography (LC) application, a solvent delivery system takes in a liquid solvent, or mixture of solvents, and provides a mobile phase to an autosampler (also called an injection system or sample manager) where a sample to be analyzed is injected into the mobile phase. The mobile phase with the injected sample flows to a chromatographic column. As the mobile phase passes through the column, the various components in the sample are differentially retained and thus elute from the column at different times. A detector senses the separated components eluted from the column and generates an output signal or chromatogram from which the identity and quantity of the analytes can be determined.

When a large volume of sample is injected into the mobile phase, the resulting chromatogram can exhibit peak broadening. Such peak broadening is a common phenomenon which can be detrimental to LC analysis in certain cases, particularly when the sample is dissolved in a "strong solvent." When injecting a significant sample volume, the strong solvent acts temporarily as the mobile phase. Consequently, the analytes in the sample are poorly retained and sample breakthrough and peak distortion can occur. A large sample volume injection is typically used to achieve the goal of improving the sensitivity of analysis; however, when breakthrough and peak distortion occur, this objective is not accomplished.

If a smaller volume of sample cannot be used, chromatographers typically dilute the sample offline. Alternatively, the sample may be evaporated and reconstituted in a weaker solvent that is more compatible with the LC process. Additional sample manipulation can result in operator error, loss of sample, sample precipitation, adsorption of sample to the wall of vials and other problems.

SUMMARY

In one example, a method for diluting a sample upon injection into a chromatographic system flow includes (a) injecting an incremental volume of a sample into a chromatographic system flow, wherein the sample includes at least one analyte dissolved in a solvent, and (b) providing an incremental volume of a mobile phase into the chromatographic system flow. The method includes repeating steps (a) and (b) until a total volume of stored sample is injected into the chromatographic system flow. A dilution ratio of the injected sample equals the sum of the incremental volumes of the sample and the mobile phase divided by the sum of the incremental volumes of the sample.

The method may be performed by controlling an injection valve in communication with a sample loop and a source of the mobile phase. The method may further include loading the total volume of the sample into the sample loop prior to a first injection of the incremental volume of the sample into the chromatographic system flow. The incremental volume of the sample may be proportional to an injection duration wherein the incremental volume of the mobile phase is proportional to a time between consecutive injections of the incremental volume of the sample.

The incremental volume of the sample may be injected into the chromatographic system flow for a first duration and the incremental volume of the mobile phase provided into the chromatographic system flow for a second duration. The dilution ratio of the injected sample may equal the sum of the sum of the first and second durations divided by the sum of the first durations. The dilution ratio of the injected sample may equal a sum of the first and second durations for a cycle of the injection valve divided by the first duration for the cycle of the injection valve.

The method may further include providing a gradient mobile phase into the chromatographic system flow after the total volume of stored sample is injected into the chromatographic system flow.

In another example, an apparatus for diluting a chromatographic sample includes an injection valve and a control module. The injection valve is configured to receive a flow of a mobile phase and a total volume of a sample. The injection valve is further configured to provide one of the mobile phase and the sample to a system flow according to a state of the injection valve. The control module is in communication with the injection valve. The control module generates a signal to control the state of the injection valve in one of a first state in which the sample is injected into the system flow and a second state in which the mobile phase is provided to the system flow. The control module further controls a duration in the first state wherein an incremental volume of the sample is injected into the system flow and a duration in the second state during which an incremental volume of the mobile phase is provided into the system flow to thereby generate a diluted sample upon injection.

A dilution ratio of the diluted sample may equal a sum of the incremental volumes of the sample and mobile phase divided by a sum of the incremental volumes of the sample. The dilution ratio of the diluted sample may a sum of the durations in the first and second states for a cycle of the injection valve divided by a duration in the first state for the cycle of the injection valve.

The apparatus may further include a mixer in fluidic communication with an output of the injection valve and/or a sample loop in fluidic communication with the injection valve and configured to hold the total volume of the sample.

In another example, a method for diluting a sample for a chromatography system includes (a) acquiring a sample fluidic plug in a sample needle and (b) acquiring a diluent fluidic plug in the sample needle. The sample fluidic plug has an incremental volume of a sample comprising at least one analyte dissolved in a solvent and the diluent fluidic plug has an incremental volume of a diluent. The method also includes repeating steps (a) and (b) until a stack of alternating sample fluidic plugs and diluent fluidic plugs is acquired wherein the stack includes a total volume of sample. The method further includes inserting the stack of alternating sample fluidic plugs and diluent fluidic plugs into a flow of mobile phase in a chromatography system. A dilution ratio of the total volume of sample equals the sum of the incremental volumes of the sample fluidic plugs and the diluent fluidic plugs divided by the sum of the incremental volumes of the sample fluidic plugs.

Step (a) may include moving the sample needle to a source of the sample and acquiring the sample fluidic plug and step (b) may include moving the sample needle to a source of the diluent and acquiring the diluent fluidic plug. Inserting the stack of alternating sample fluidic plugs and diluent fluidic plugs into a flow of mobile phase in a chromatography system may include reconfiguring a flow path of the mobile phase to include the sample needle. Inserting the stack of alternating sample fluidic plugs and diluent fluidic plugs into a flow of mobile phase in a chromatography system may include loading the stack of alternating sample fluidic plugs and diluent fluidic plugs into a sample loop and injecting the stack of alternating sample fluidic plugs and diluent fluidic plugs from the sample loop into the mobile phase of the chromatography system. A back and forth passage of the stack of alternating sample fluidic plugs and diluent fluidic plugs may be repeated during loading of the stack into the sample loop.

The method may further include providing a gradient mobile phase into the chromatographic system flow after the total volume of stored sample is injected into the chromatographic system flow.

In another example, an apparatus for diluting a chromatographic sample includes an injection valve, a sample needle, a source of a sample, a source of a diluent, a sample needle controller and a control module. The injection valve is configured to receive a flow of a mobile phase. The sample needle is in fluidic communication with the injection valve. The sample needle controller is in communication with the sample needle and is configured to control a movement of the sample needle to the source of the sample to acquire a fluidic plug having an incremental volume of the sample and to the source of the diluent to acquire a fluidic plug having an incremental volume of the diluent. The control module is in communication with the injection valve and the sample needle controller. The control module generates commands to control the state of the injection valve and acquisition of the fluidic plugs of the sample and the diluent to thereby acquire a stack of alternating sample fluidic plugs and diluent fluidic plugs. A dilution ratio of a total volume of the sample in the sample needle equals a sum of the incremental volumes of the sample fluidic plugs and the diluent fluidic plugs divided by a sum of the incremental volumes of the sample fluidic plugs.

The control module may be configured to reconfigure the sample needle to be in a path of a mobile phase of the chromatography system.

The apparatus may further include a sample loop in fluidic communication with the injection valve and configured to hold the stack of stack of the alternating sample fluidic plugs and diluent fluidic plugs.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

As used herein, a "sample" means one or more compounds to be analyzed and a solvent in which the compounds are dissolved. An "incremental volume of sample" means a volume of sample that is less than a total volume of sample to be injected into a chromatography system flow. An "incremental volume of mobile phase" means a volume of mobile phase that is less than a total volume of mobile phase used to dilute a sample during injection according to methods described below. In general, a sum of the incremental volumes of sample is equal to the total volume of sample used in a diluted sample injection. Similarly, a sum of the incremental volumes of mobile phase during the diluted sample injection is equal to the total volume of mobile phase used to dilute the sample during the diluted sample injection. A fluidic plug of the sample or mobile phase means a discrete volume contribution of the sample or mobile phase into the system flow.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

When using a reverse phase column in a LC system, it is preferable to have the sample dissolved in as small a volume of "weak solvent" as possible so that the analytes contained in the sample can be focused at the head of the column and elute as well-formed peaks. Moreover, to increase the sensitivity of the LC separation, a greater mass load on the chromatographic column is often desired. Due to sample preparation or solubility constraints, samples are often dissolved in strong solvents such as acetonitrile (ACN) or methanol. By way of an example, a common protein precipitation technique for bioanalysis (mixing aqueous sample 1:2 with acetonitrile) results in sample content of 67% acetonitrile or greater. The presence of the strong solvent substantially interferes with the LC analysis by distorting the shapes of the peaks in the chromatogram.

Figure 1:
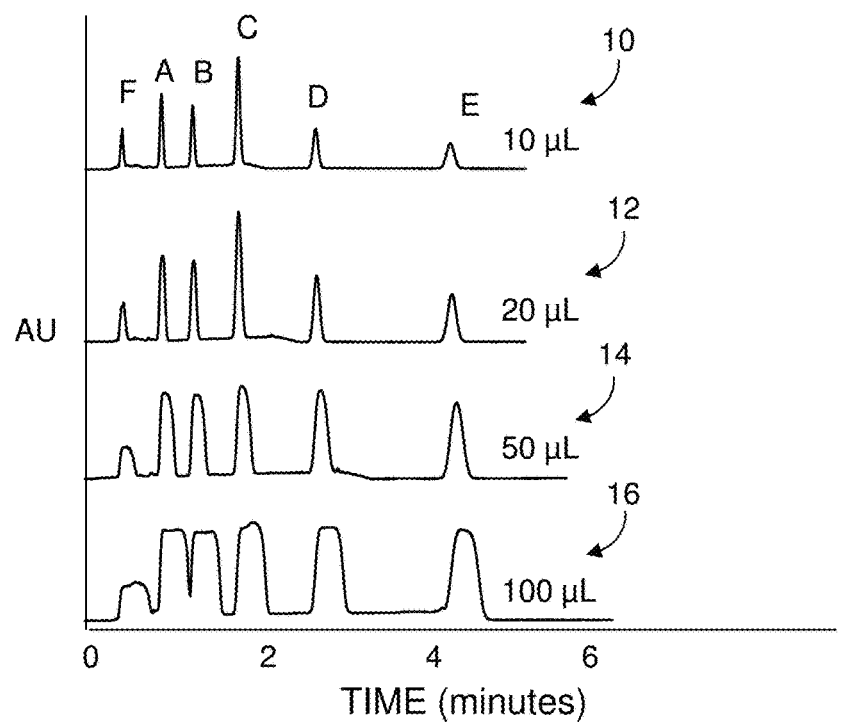
FIG. 1 shows four chromatograms that demonstrate the effect of increasing sample volume on peak height and peak width for an isocratic separation.

FIG. 1 shows four chromatograms that demonstrate the effect of increasing sample volume on peak height and peak width for an isocratic separation. The chromatograms are vertically offset from each other for clarity. In this example, the sample was dissolved in a strong solvent of 50% ACN which matched the mobile phase strength. Chromatograms 10, 12, 14 and 16 represent separations using 10 µL, 20 µL, 50 µL and 100 µL sample injection volumes, respectively, with each sample injection volume having the same relative contribution of sample analytes. Letters "A" to "E" are used to designate the peaks for different sample analytes and the letter "F" designates the peak for an unretained void marker (uracil).

Typically, as injected sample volume increases, the peak heights increase accordingly; however, this trend does not occur for the illustrated example. Instead, the peak heights are substantially unchanged and the area under the peaks increases in proportion to the injected sample volume. Since the peaks become broader instead of increasing in height, the sensitivity (or signal to noise) does not increase with increasing sample volume. Thus it can be readily seen that a large sample volume in a strong solvent is not beneficial.

Figure 2:
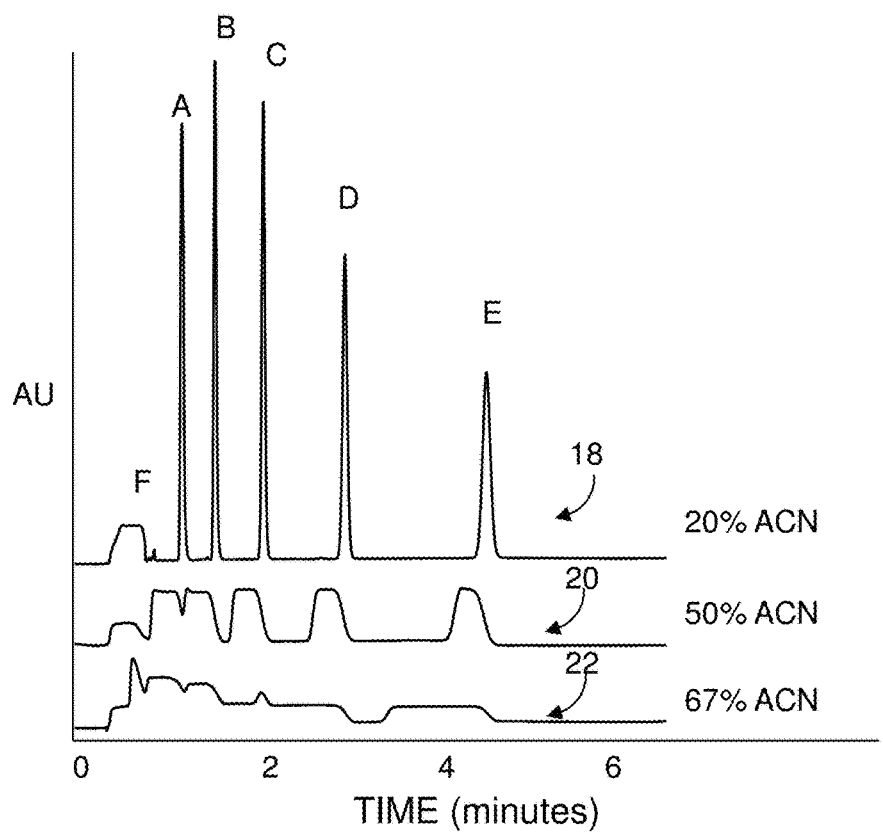
FIG. 2 shows three chromatograms that demonstrate the effect of sample solvent strength for an isocratic separation using a 100 μL sample injection.

FIG. 2 shows the effect of sample solvent strength for an isocratic separation in a mobile phase of 50% ACN. The three chromatograms are vertically offset from each other for clarity. For chromatograms 18, 20 and 22, the sample solvent had a 20%, 50% and 67% ACN composition, respectively. Each sample injection volume was 100 µL and contained the same analyte concentrations. The mobile phase flow rate was 0.3 mL/minute for each separation thus the sample load time for each injection was 20 seconds.

As evident in chromatogram 18, for a 20% ACN solvent, the analytes A to E are focused at the beginning of the chromatographic column and elute as narrow peaks. Void marker F is substantially unretained and elutes as a peak having a 20 second width that corresponds to the loading time. For the sample in a 50% ACN sample solvent, as shown in chromatogram 20, the sample solvent matches the mobile phase strength. All the sample zones (A to E, and void marker F) are approximately the same width as the 20 second sample load time. The third chromatogram 22 shows the sample in the 67% ACN sample solvent which is stronger than the mobile phase. In this instance, the peaks are actively smeared so that the zones are wider than 20 seconds and peaks fronts start at an earlier elution time. This result is due to the zones passing through the column faster (i.e., less retained). Consequently, the peaks were widened; however, the peaks later move slower as they are "pushed" by the relatively weaker 50% ACN mobile phase. The peaks in chromatogram 22 are not well resolved and overlap with other peaks. The three chromatograms 18, 20 and 22 demonstrate that a strong sample solvent has a detrimental effect on peak width, while a weak mobile phase is acceptable. With a weak sample solvent, larger sample volumes can be injected as long as the analytes are well retained.

Figure 3A:
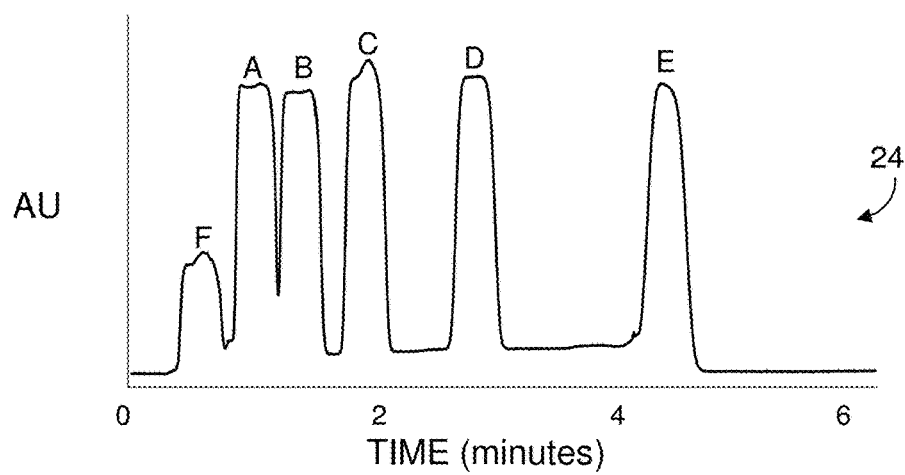
FIG. 3A shows a chromatogram for an isocratic mobile phase as another example of the effect of sample solvent strength where the injected sample volume was 100 μL.

FIG. 3A shows another example of the effect of a strong sample solvent on a chromatogram using a mobile phase flow rate of 0.3 ml/min and a 2.1 mm×50 mm Acquity UPLC® CSH C18 column in an Acquity I-Class UPLC® system available from Waters Corporation of Milford, Mass. The 100 µL sample volume contains alkylphenones in a solvent of 50% acetonitrile content. An isocratic mobile phase of 50% acetonitrile was used to perform the separation. The large sample volume results in the substantial width of the five peaks in the chromatogram 24 with each peak corresponding to a particular one of the components in the injected sample. The remaining peak, labeled "F", corresponds to a volume marker. Each peak has a width of approximately 20 seconds corresponding to the duration of the injection.

Figure 3B:
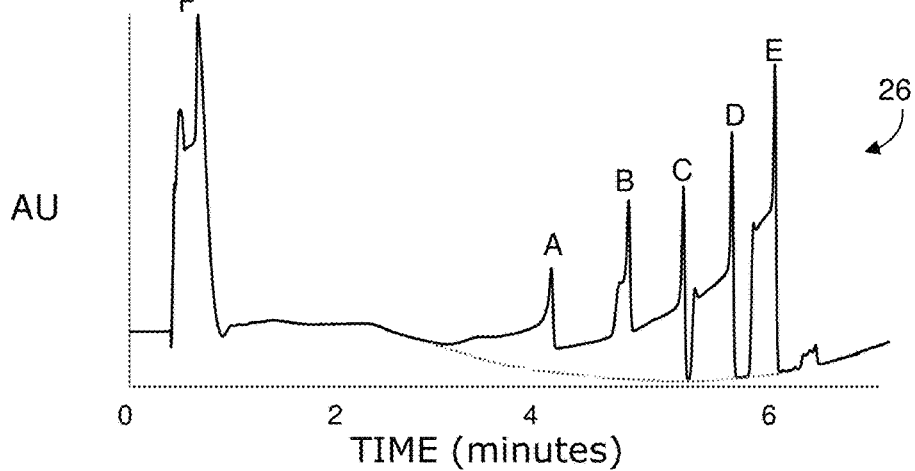
FIG. 3B shows a chromatogram for a gradient separation using the same mass load and sample volume as the example shown in FIG. 3A with a stronger sample solvent.

FIG. 3B shows the results for a same loading and mobile phase flow rate using a 67% ACN sample volume; however, a gradient separation was performed. The gradient of the mobile phase started at 10% ACN and composition varied linearly from 10% ACN to 90% ACN at a 10% ACN change per minute. The sample was partially diluted as it entered the column at the 10% ACN gradient composition, but each peak in the chromatogram 26 is still significantly broadened by the sample solvent. The peaks are distorted and exhibit fronting behavior. The spikes at the rear boundary of the peaks are due to gradient peak focusing; however, peaks A to C are still so broadened that they overlap and only distorted peaks D and E are resolved from the other components. Thus the inherent focusing effect present in gradient elution is not sufficient to compensate for the band broadening effect caused by injecting a large sample volume in a strong solvent.

Figure 3C:
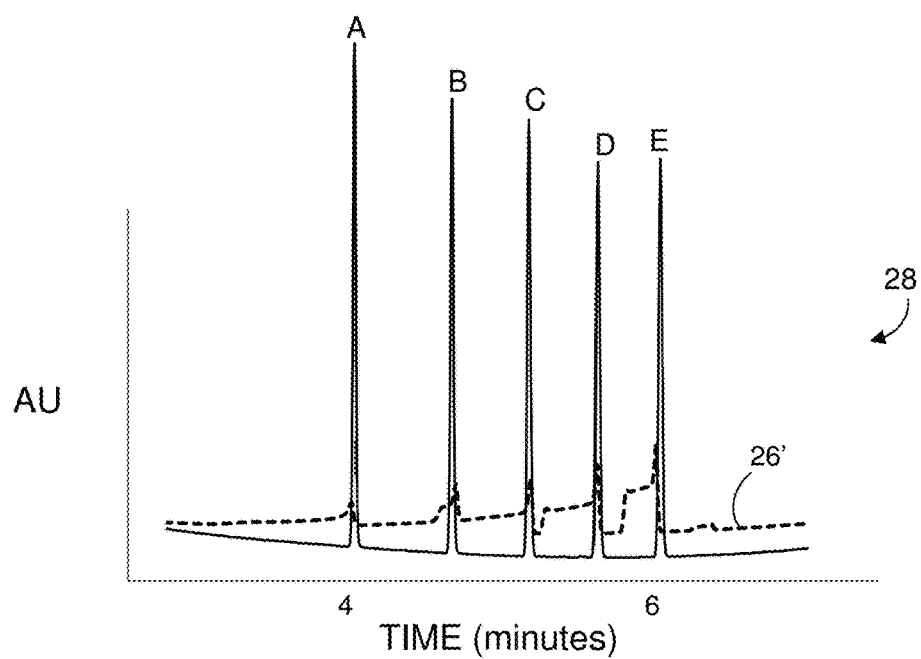
FIG. 3C shows a chromatogram for a gradient separation using the same mass load as the example shown in FIG. 3B for a smaller sample volume. The figure also shows a portion of the chromatogram of FIG. 3B for comparison.

FIG. 3C shows a chromatogram 28 for a 1 μL injection for the same sample mass load on the column. For comparison, a portion of the chromatogram 26 of FIG. 3B is superimposed as dashed line 26'. The chromatogram 28 for the 1 μL injection exhibits five well-defined peaks. Thus the effect of a large volume sample injection can be seen to be detrimental to high performance LC (HPLC) and ultra performance LC (UPLC® or UHPLC), particularly when the sample is dissolved in a strong solvent. While it is possible to dilute samples off-line to reduce the effect of using a strong solvent, the solubility of analytes may be adversely affected. Such a dilution can result in sample adsorption to vials or may add variability in the LC analysis due to the additional sample processing.

In microscale LC, the volumes of chromatographic columns are typically much smaller; however, even microscale columns (e.g. 0.15 mm inner diameter) are often used with sample volumes that range from 1 μL to 5 μL. Volumetrically scaling these sample volumes to a UPLC scale results in a sample injection volume that is approximately 200 times greater, corresponding to volumes from 200 μL to 1 mL. These volumes are significantly greater than volumes normally used in standard LC separations. Consequently, microscale LC separations are more adversely affected by injections using strong sample solvents as described above. The problem is compounded when users of microscale LC systems further increase sample volumes in an attempt to enhance the sensitivity of an LC analysis.

In brief overview, embodiments of a method for injecting a large volume of a chromatographic sample as described herein are based on introducing incremental volumes of sample into the mobile phase. In effect, small fluidic plugs of sample are separated by fluidic plugs of mobile phase which acts as a weak diluent. Advantageously, a passive mixing of these alternating plugs of sample and mobile phase occurs by transport dynamics in connecting tubing or within an additional mixer disposed upstream from the chromatographic column. With proper incremental volumes of sample and mobile phase and sufficient mixing, the result is delivery of a diluted sample to the column. Consequently, the sample analytes can be focused at the head of the column and sharp symmetrical peaks can be observed in the effluent from the column for a subsequently applied gradient mobile phase. If any sample precipitation occurs during the dilution process, the sample is still delivered to the column and later re-dissolved in the gradient mobile phase.

Figure 4:
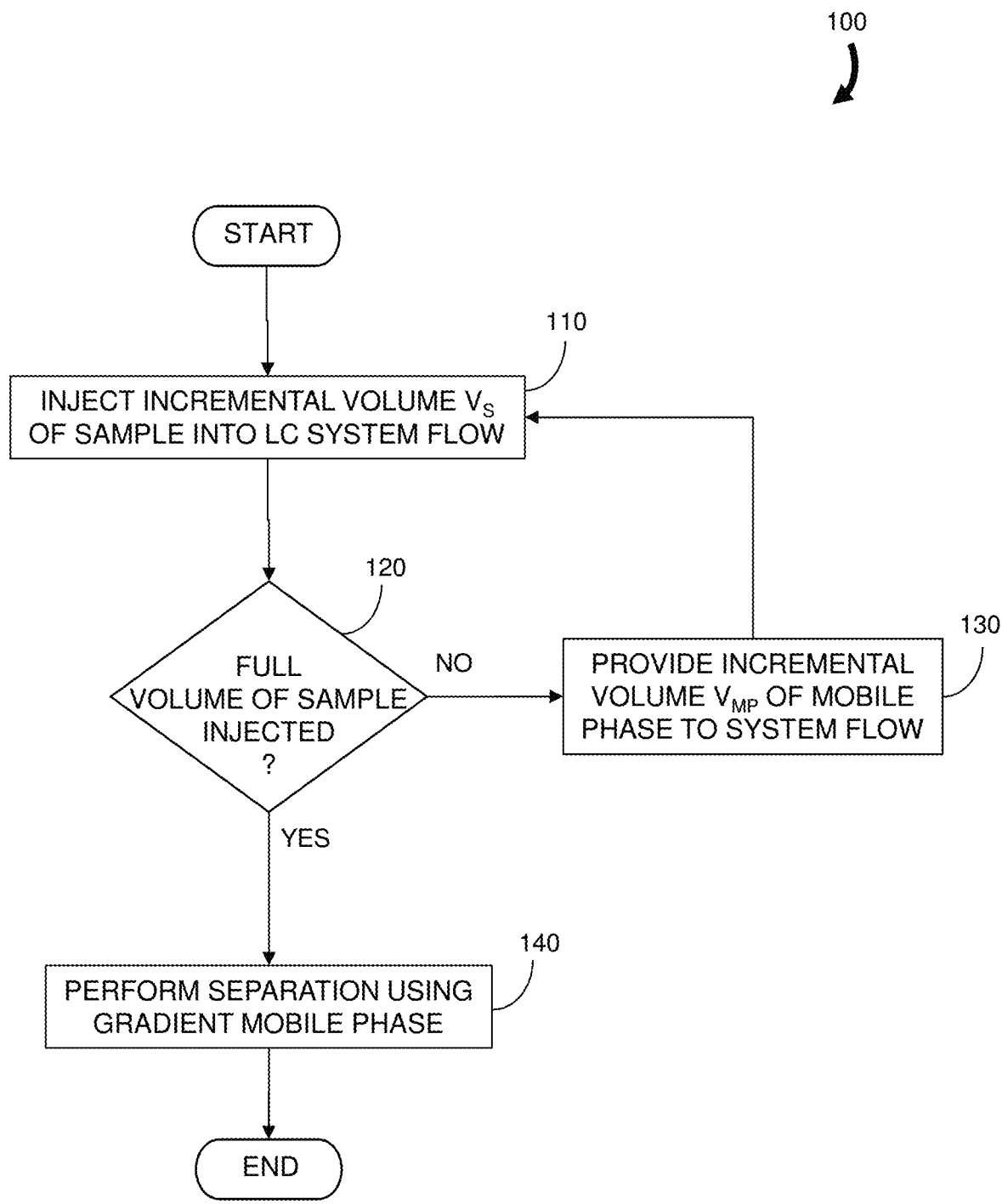
FIG. 4 is a flowchart representation of an embodiment of a method for diluting a sample upon injection into a chromatographic system flow.

FIG. 4 is a flowchart representation of an embodiment of a method 100 for diluting a sample upon injection into a chromatographic system flow. The total volume of sample is typically stored in a sample loop plumbed to an injection valve prior to the initiation of injection. Initially, the injection valve passes an isocratic mobile phase though a valve outlet toward a chromatographic column. At the initiation of sample injection, an incremental volume $V_S$ of a total volume of sample to be injected is injected (step 110) into the LC system flow toward the column. If the total volume of sample in the sample loop has not been depleted (determined at step 120), the valve switches state to provide (step 130) an incremental volume $V_{MP}$ of mobile phase into the system flow. Steps 110 through 130 are repeated until the total volume of sample is injected (determined at step 120). At or after the time when the iterative sample injection sequence is completed, the solvent delivery subsystem of the LC system changes the isocratic mobile phase to a gradient mobile phase to perform (step 140) the separation. The method 100 allows an effective sample dilution according to the ratio $$(V_S + V_{MP})/V_S$$

For example, a dilution ratio of ten is achieved if the incremental volume $V_S$ of a sample plug is 1 μL and the incremental volume $V_{MP}$ of a mobile phase plug is 9 μL. In this example, if a 100 μL undiluted sample were injected from the sample loop, the injection valve would be cycled 100 times to complete a diluted sample injection. It should be noted that due to additional zone broadening that can occur because the sample is passed through an injection loop, a larger volume and longer cycling may be required to inject the entire volumetric content of the sample.

Figure 5A:
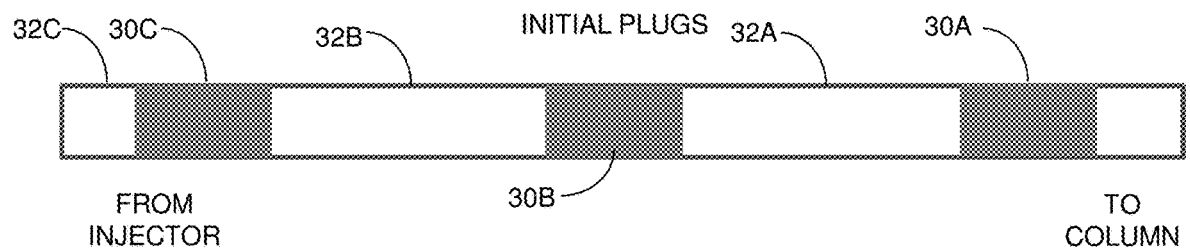
FIG. 5A is a graphical depiction of the composition of a portion of the system flow at the outlet of an injection valve according to the method of FIG. 4.

FIG. 5A is a graphical depiction of the composition of a portion of the system flow at the outlet of the injection valve according to the method 100 of FIG. 2. The system flow is from left to right corresponding to the flow from the injection valve to the chromatographic column. Stated otherwise, fluid at the right in the figure is dispensed from the injection valve at an earlier time than fluid further left. The system flow includes a fluidic plug 30A of the incremental volume of sample in the strong sample solvent and a subsequent fluidic plug 32A of the isocratic mobile phase. The next plug 30B of incremental volume of sample occurs followed by another plug 32B of mobile phase. Subsequently, sample plug 30C and mobile phase plug 32C occur and the process continues with additional plugs (not shown) of incremental volumes of sample and mobile phase until the total volume of sample for the LC analysis has been injected into the system flow. In effect, the intervening plugs 32 of mobile phase act as a weak diluent for the sample. As illustrated, the plugs 32 of mobile phase are approximately twice the volume of the plugs 30 of sample, resulting in a dilution ratio of approximately three.

Figure 5B:
FIG. 5B is a graphical depiction of the passive mixing of the fluidic plugs of FIG. 5A achieved at a location downstream from the injection valve in the system flow.
Figure 5C:
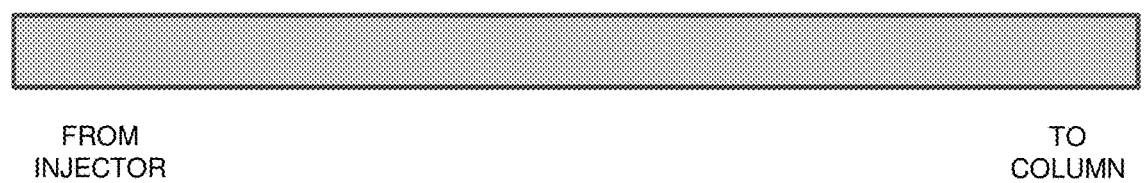
FIG. 5C is a graphical depiction of further mixing of the fluidic plugs of FIG. 5B into a constant composition diluted sample flow.

FIG. 5B illustrates the passive mixing of the fluidic plugs achieved at a location downstream in the system flow. There are no sharp plug boundaries as the transport dynamics within the flow path result in a diffusion of the contents of each plug into the adjacent plugs. With sufficient mixing, the composition of the system flow is a constant diluted sample flow as shown in FIG. 5C. For example, complete mixing may be achieved further downstream in a sufficiently long fluid path. In some embodiments a mixer is provided in the flow path between the injection valve and the chromatographic column to ensure that a sufficiently mixed diluted sample is received at the head of the column.

This cycling of sample and mobile phase plugs and the subsequent mixing of the system flow assists in focusing the sample analytes at the head of the column so that a subsequent separation performed with a gradient mobile phase results in sharp symmetrical peaks in the chromatogram.

As described above, the dilution ratio is dependent on the incremental volumes $V_S$ and $V_{MP}$ of sample and mobile phase. For example, 5 μL incremental volumes of sample can be separated by 10 μL incremental volumes of a weak mobile phase to achieve a dilution ratio of three. The volume of a plug of liquid in the flow from the injection valve is proportional to the time that the valve remains in the particular state for dispensing the plug. Consequently, the dilution ratio can be controlled by controlling the switching times of the injection valve.

Figure 6:
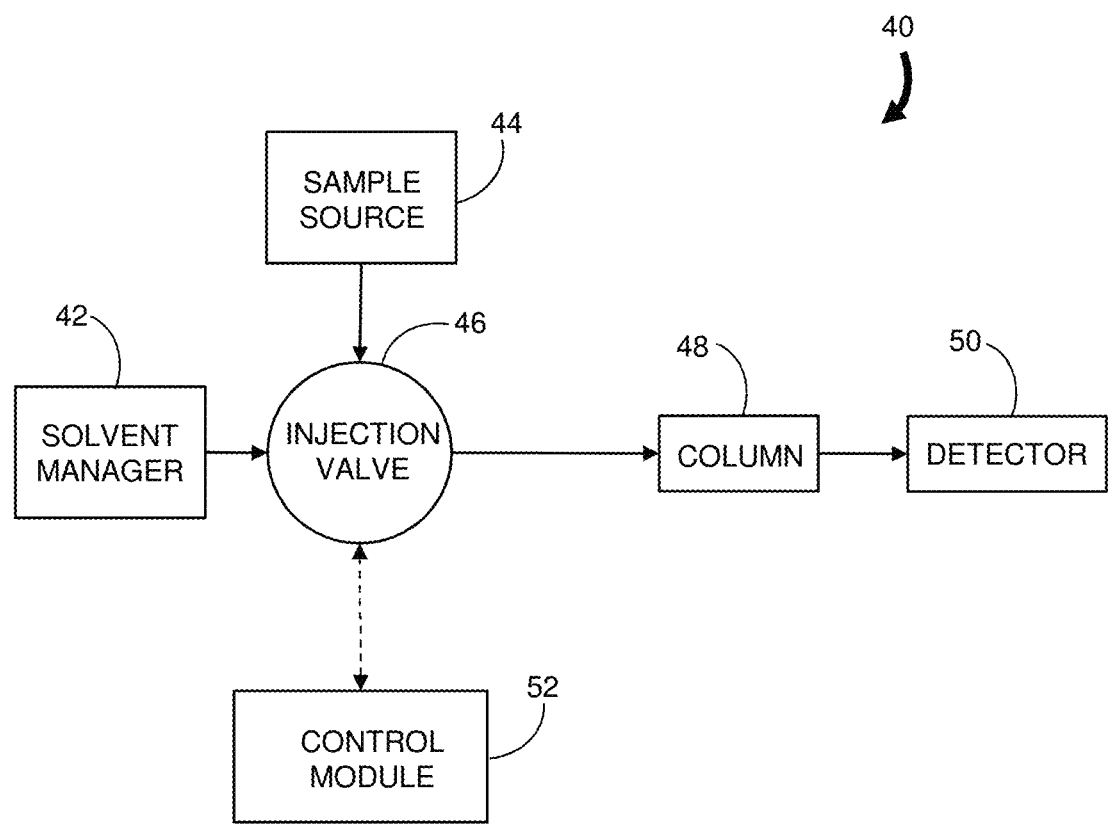
FIG. 6 is a block diagram of an embodiment of a liquid chromatography system configured to practice the method of FIG. 4.

FIG. 6 is a block diagram of a LC system 40 configured to practice the method 100 of FIG. 4. The system 40 includes a solvent manager 42 and a sample source 44 (e.g., a sample manager or autosampler) in fluidic communication with an injection valve 46. The sample source 44 provides a sample dissolved in a solvent which is used to load a sample loop (not shown) coupled to the injection valve 46 prior to the start of sample injection. The outlet of the injection valve 46 is in fluidic communication with a chromatographic column 48 which in turn is coupled to a detector 50 for determination of components eluted from the column 48. A control module 52 is in communication with the injection valve 46 and the detector 50. In various embodiments, the control module 52 generates one or more signals to control the switching times of the injection valve 46 for providing the incremental volumes $V_S$ and $V_{MP}$ of sample and mobile phase, respectively. The control module 52 also communicates with the detector 50 for data acquisition and control processes. The control module 52 may issue commands to the injection valve 46 and control data acquisition in response to instructions provided in the form of a computer program product embodied in one or more computer readable media having computer readable program code embodied thereon.

As the injection valve 46 switches to inject each incremental volume $V_S$ of sample onto the column 48, the incremental volume $V_S$ may compress a small amount as the column 48 generates high pressure. Subsequently, as the injection valve 46 switches back to provide the next incremental volume of mobile phase, the pressure is released and, as a result, some of the expanding sample in the sample loop may escape. Thus it is preferred that the sample in the sample loop be maintained under pressure to eliminate such sample loss. For example, one or more valve outlets on the injection valve 46 may be plugged to ensure that the contents of the sample loop remain properly pressurized.

Performance of a dilution according to the method 100 described above was examined with a 2.1 mm×50 mm BEH CSH C18, 1.7 μm column using the Acquity I-Class UPLC® system. An external injector (e.g., Cheminert 020-015H two position 6-port valve available from Valco Instruments Company Incorporated (VICI®) of Houston, Tex. was used to inject a sample of an ultraviolet (UV) tracer in a 67% acetonitrile solvent in various volume increments. Initially, the chromatographic column was bypassed and the injection valve was directly coupled to a UV detector through a 100 cm length of capillary having a 125 μm internal diameter. A flow rate of 0.3 mL/min was used and the valve timing was set for incremental injection intervals of about 0.2 s, resulting in an incremental volume $V_S$ for each sample plug of approximately 1.0 μL. The incremental volumes $V_{MP}$ of the intervening plugs of mobile phase were varied to examine different dilution ratios.

Figure 7:
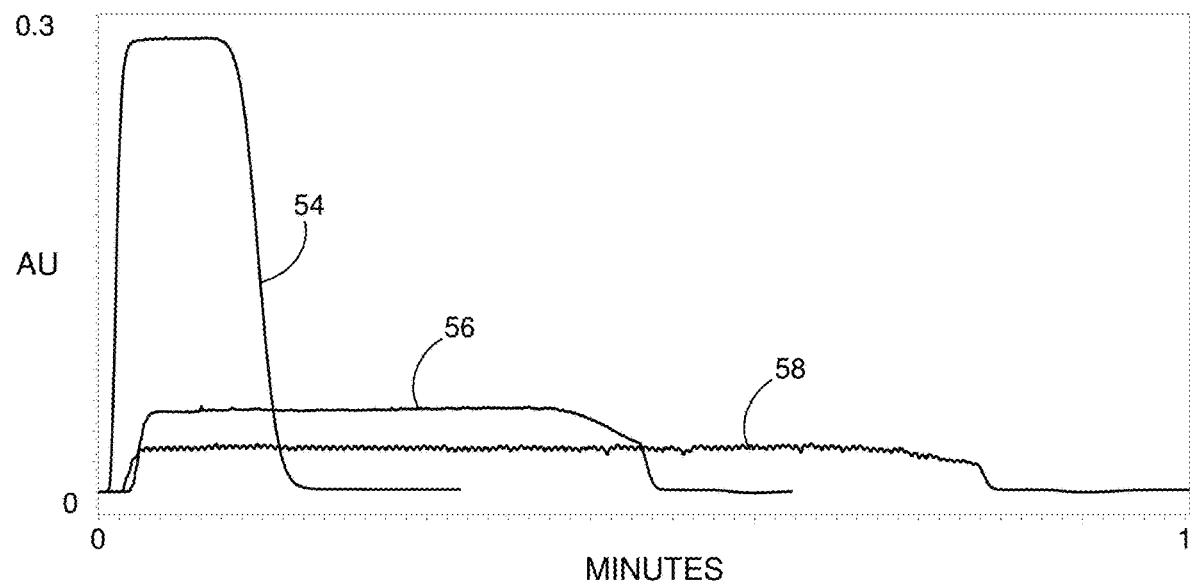
FIG. 7 is a graphical representation of the detector response for an ultraviolet tracer sample as a function of time according to different injection scenarios.

FIG. 7 is a graphical representation of the detector response for a UV tracer sample as a function of time according to different injection scenarios. Plot 54 shows the response for a single injection of the 100 μL of sample in the injection loop coupled to the injection valve. The response is flat at approximately 0.3 absorbance units for most of the response duration. Plot 56 corresponds to a response for 0.2 s duration injections of incremental volumes $V_S$ of sample, each followed by a 0.4 s intervening mobile phase plugs of incremental mobile phase volumes $V_{MP}$, for a total of 120 incremental injection cycles. Plot 58 corresponds to a response for 0.2 s duration injections of incremental volumes $V_S$ of sample, each followed by a 0.8 s intervening mobile phase plug of volume $V_{MP}$, for a total of 120 incremental injection cycles. As the incremental volumes are proportional to the injection durations and mobile phase plug durations occurring between consecutive injections of incremental sample volumes, the dilution ratios corresponding to the three plots 54, 56 and 58 are one, five and ten, respectively. The rapid injection of small volume fluidic plugs results in a substantially homogenous mixture.

Figure 8:
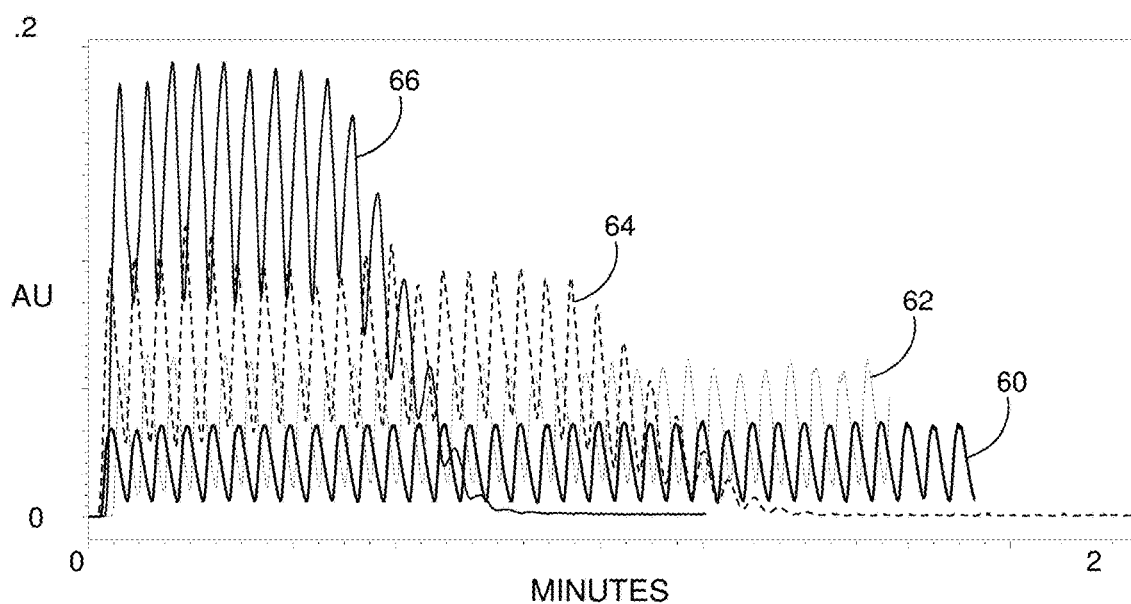
FIG. 8 is a graphical representation of the results of an evaluation of different incremental sample volumes for a three second injection valve cycle in which each plot indicates the magnitude of a detected ultraviolet tracer sample as a function of time.

A large number of cycles can reduce the lifetime of the injection valve. Thus there is a preference to lower the number of cycles while maintaining an acceptable level of mixing. FIG. 8 is a graphical representation of the results of an evaluation of different incremental sample volumes $V_S$ for a 3.0 s injection valve cycle where each plot indicates the magnitude of the detected UV tracer sample as a function of time. Greater incremental sample volumes $V_S$ result in shorter total injection times. The evaluation was performed using conditions and instrumentation similar to that described above for FIG. 7, namely a 100 μL sample loop with a UV tracer in a 67% acetonitrile solvent, a flow rate of 0.3 ml/min and a 100 cm capillary having a 125 μm inner diameter. The capillary bypassed the chromatographic column and was used to passively mix the system flow.

Plots 60, 62, 64 and 66 correspond to cycles having sample plug durations of 0.4 s, 0.6 s, 1.0 s and 1.8 s, respectively, and mobile phase plug durations of 2.6 s, 2.4 s, 2.0 s and 1.2 s, respectively. Thus all plots correspond to a full cycle duration of 3.0 s. Various levels of dilution are evident by the reduced intensity of the UV detector signal. It can be seen by significant ripple or spikes in the plots that insufficient mixing occurs. Capillaries having larger inner diameters can improve the passive mixing; however, it is generally preferable to provide for more efficient mixing, for example, by including a mixer in the system flow upstream from a chromatographic column to ensure that a heterogeneous mixture is received at the column.

Figure 9:
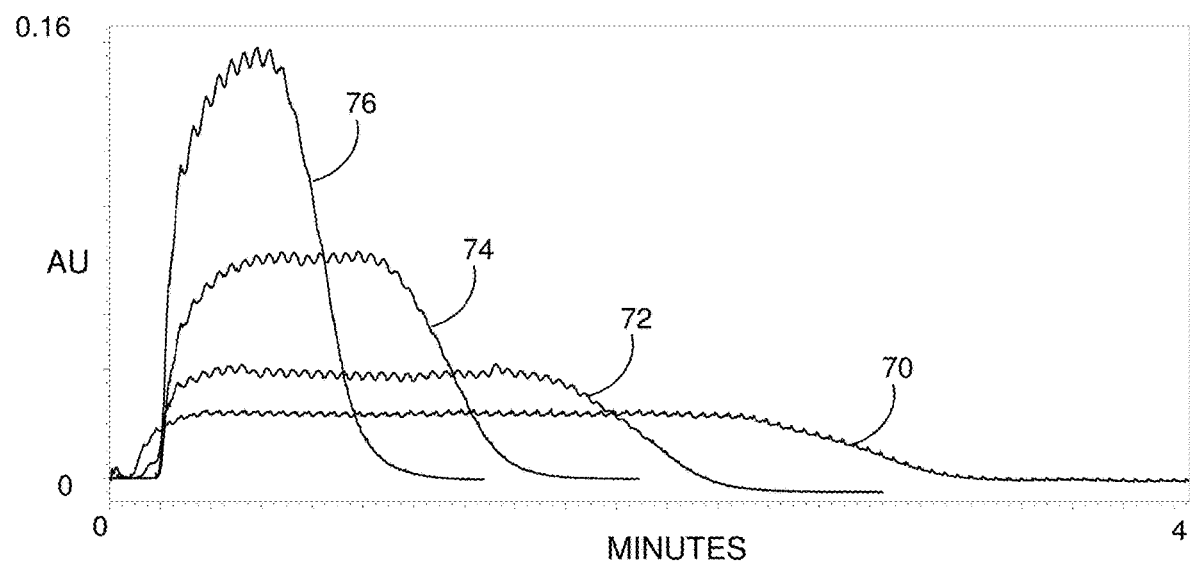
FIG. 9 is a graphical representation of an evaluation for a system configuration similar to that used for FIG. 8 with the addition of a 50 μL mixer and the use of a 100 μm capillary.

A configuration for a system flow in which a 50 μL UPLC mixer packed with 200 μm zirconium oxide beads was positioned downstream from the injection valve was evaluated. The configuration was similar to the configuration providing the results shown in FIG. 8 except that the capillary had a 100 μm inner diameter. FIG. 9 is a graphical representation of the results of the evaluation. The injection valve timing for plots 70, 72, 74 and 76 was the same as the timing in plots 60, 62, 64 and 66, respectively, of FIG. 8. It can be seen that the presence of the mixer results in a significant reduction in the signal ripple in each plot which corresponds to a substantially heterogeneous mixing of the sample plugs with the mobile phase plugs.

Figure 10:
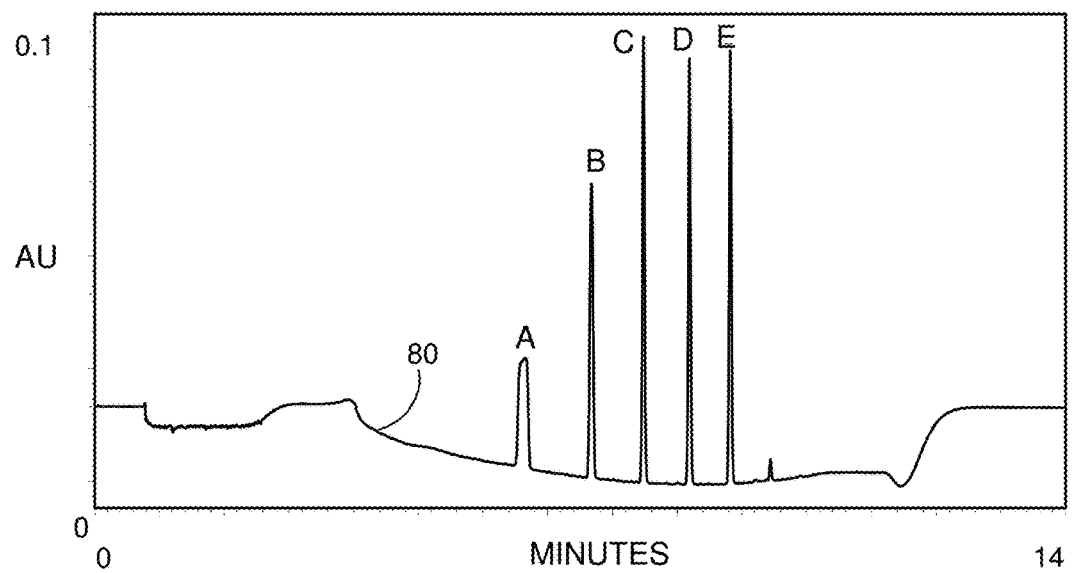
FIG. 10 shows an example of a chromatogram resulting from a separation performed according to the method of FIG. 4 using a 50 μL mixer in-line between an injection valve and a chromatographic column.

In a separate evaluation, the 50 μL UPLC mixer was used in-line between the injection valve and a 2.1 mm×50 mm CHS C18 1.7 μm column. The sample included five alkylphenones dissolved in 67% acetonitrile for a 100 μL sample volume. The injection valve was operated to provide sample plugs of 0.5 s duration within a full cycle time of 3.0 s resulting in a dilution ratio of six. Thus the acetonitrile concentration in the dilution was effectively reduced to 11.2%. FIG. 10 shows the resulting chromatogram. Although the least retained peak A exhibits some partial broadening, the other peaks B, C, D and E are well-defined, and the chromatogram 80 represents a substantial improvement with respect to the chromatogram 26 of FIG. 3B for which a similar configuration and sample volume was used without sample dilution. The peaks in FIG. 10 exhibit an improvement in peak height by at least three times to as much as twenty times the peak heights in FIG. 3B.

Figure 11:
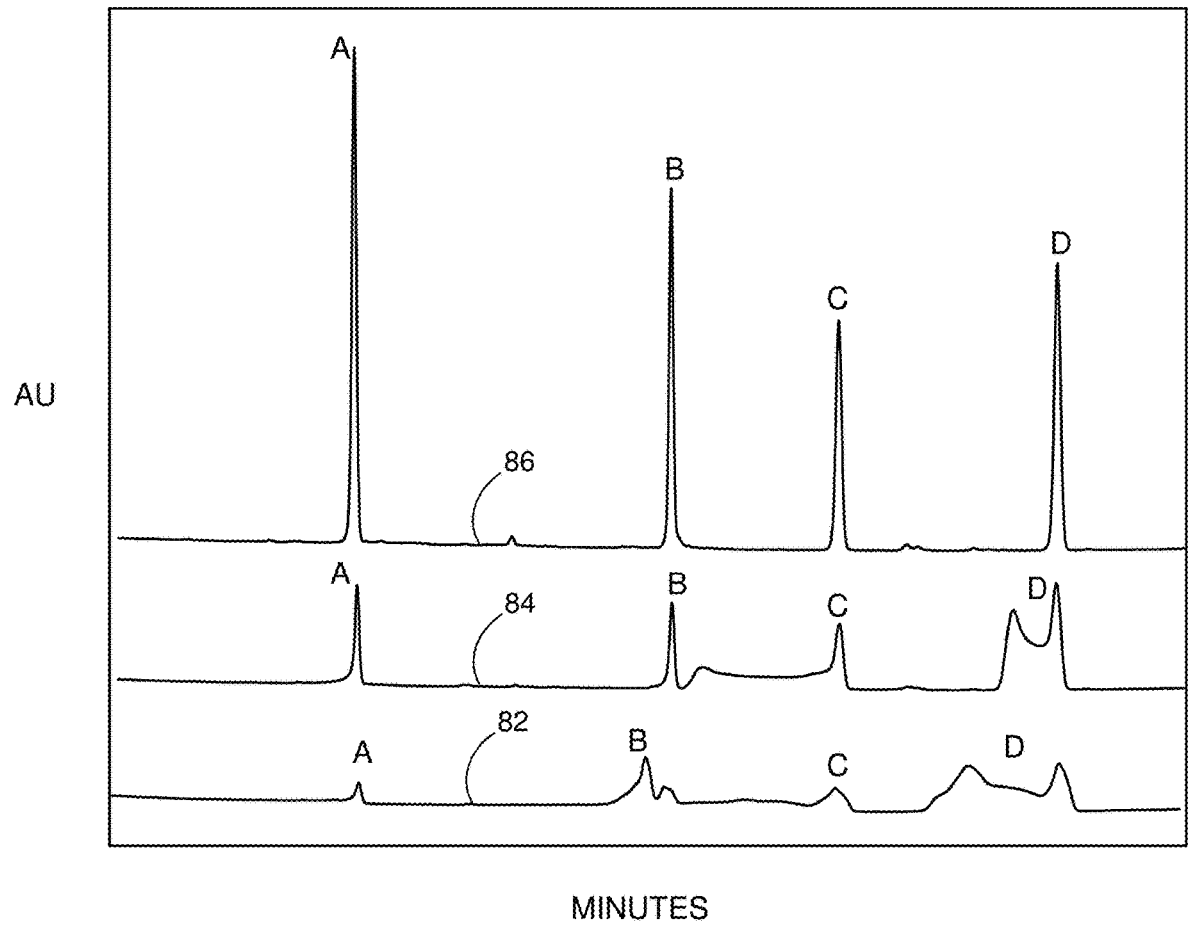
FIG. 11 shows the chromatograms obtained for an analysis of four drugs dissolved in a sample solvent of 67% acetonitrile in a total sample volume of 100 μL for (1) a single injection without a mixer, (2) a single injection using a mixer and (3) multiple incremental volume injections using a mixer.

FIG. 11 shows the results obtained on an LC analysis of four drugs: Naringin, Reserpin, Naproxen and Phenyl butazone, corresponding to peaks A, B, C and D in the three chromatograms 82, 84 and 86. The drugs were dissolved in a sample solvent of 67% acetonitrile in a total sample volume of 100 μL and a 2.1 mm×50 mm CSH C18 1.7 μm chromatographic column was used to perform the separation. The chromatograms 82, 84 and 86 are shown on the same vertical scale for a UV detector signal; however, each chromatogram is vertically displaced from the other chromatograms for convenience of comparison.

A single injection of the 100 μL sample without the use of a mixer yielded the chromatogram 82 with the smallest peak heights and broadest peak widths. A second injection was performed with the addition of a 50 μL UPLC® mixer inline between the injection valve and the chromatographic column, resulting in a chromatogram 84 with a minor improvement in peak height and a reduction in peak widths; however, significant peak distortion exists. A third injection was performed using the mixer and by injecting 22 incremental volumes of the sample to achieve a dilution ratio of six such that an effective diluted sample injection of a 600 μL volume at 11.2% acetonitrile concentration was provided to the head of the column and results in a chromatogram 86 having well-defined peaks. Due to sample breakthrough of the weakly-retained Naringin in the single loop injections, the area of the peaks corresponding to Naringin in the first two chromatograms 82 and 84 are only 5% and 20%, respectively, of the area for the corresponding peak in the third chromatogram 86 for the incremental volume injection of the sample.

In embodiments described above, the generation of alternating fluidic plugs of sample and mobile phase are formed at the injection valve. Alternatively, the alternating fluidic plugs can be formed in a sample needle. The resulting stack of fluidic plugs in the needle are subsequently introduced into the flow of mobile phase within the chromatography system by reconfiguring the needle to be part of the system flow path or by delivering the stack of fluidic plugs to a sample loop to await injection into the system flow path.

Figure 12:
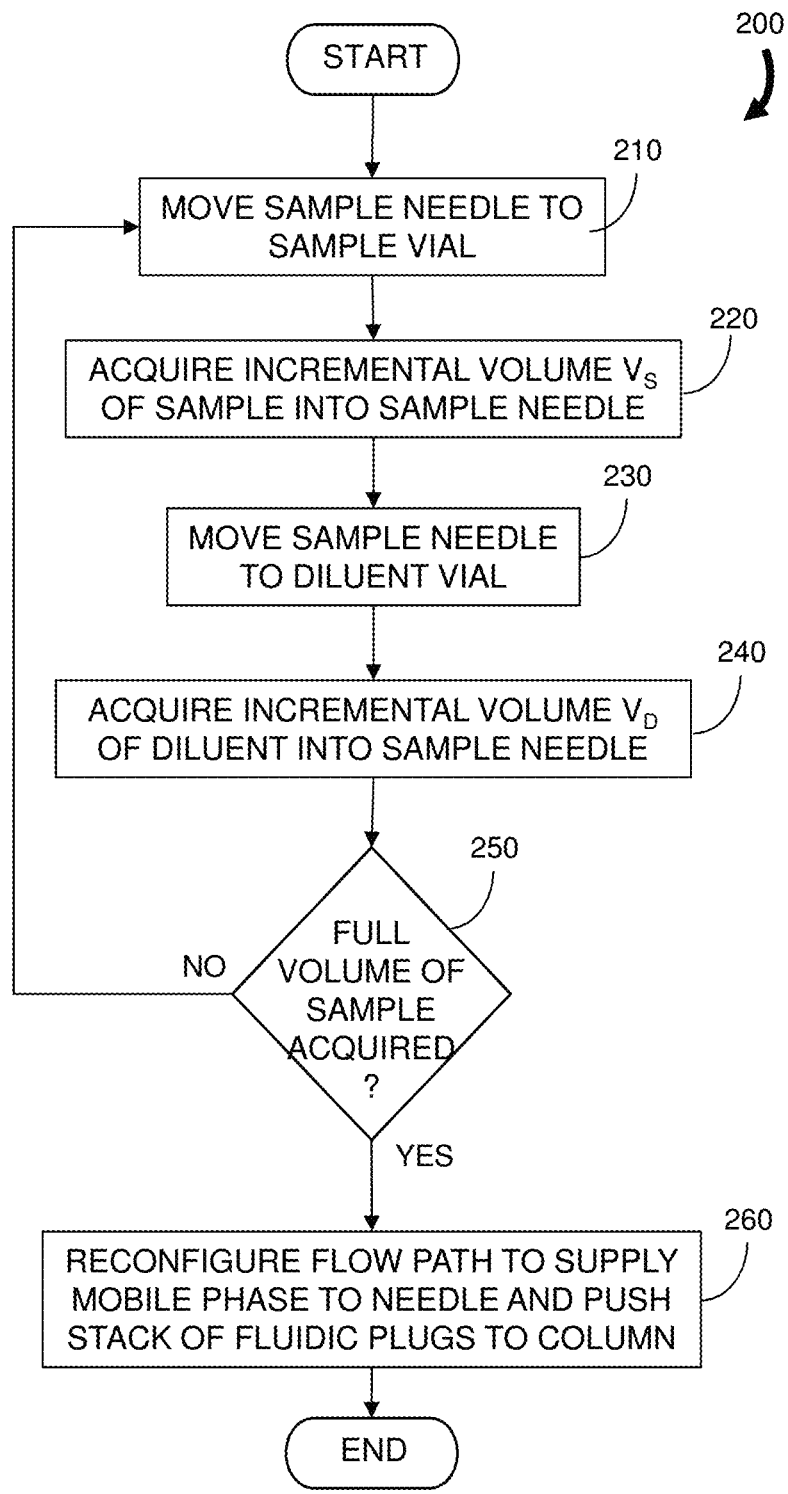
FIG. 12 is a flowchart representation of an embodiment of a method for injecting a diluted sample into a chromatographic system flow.
Figure 13:
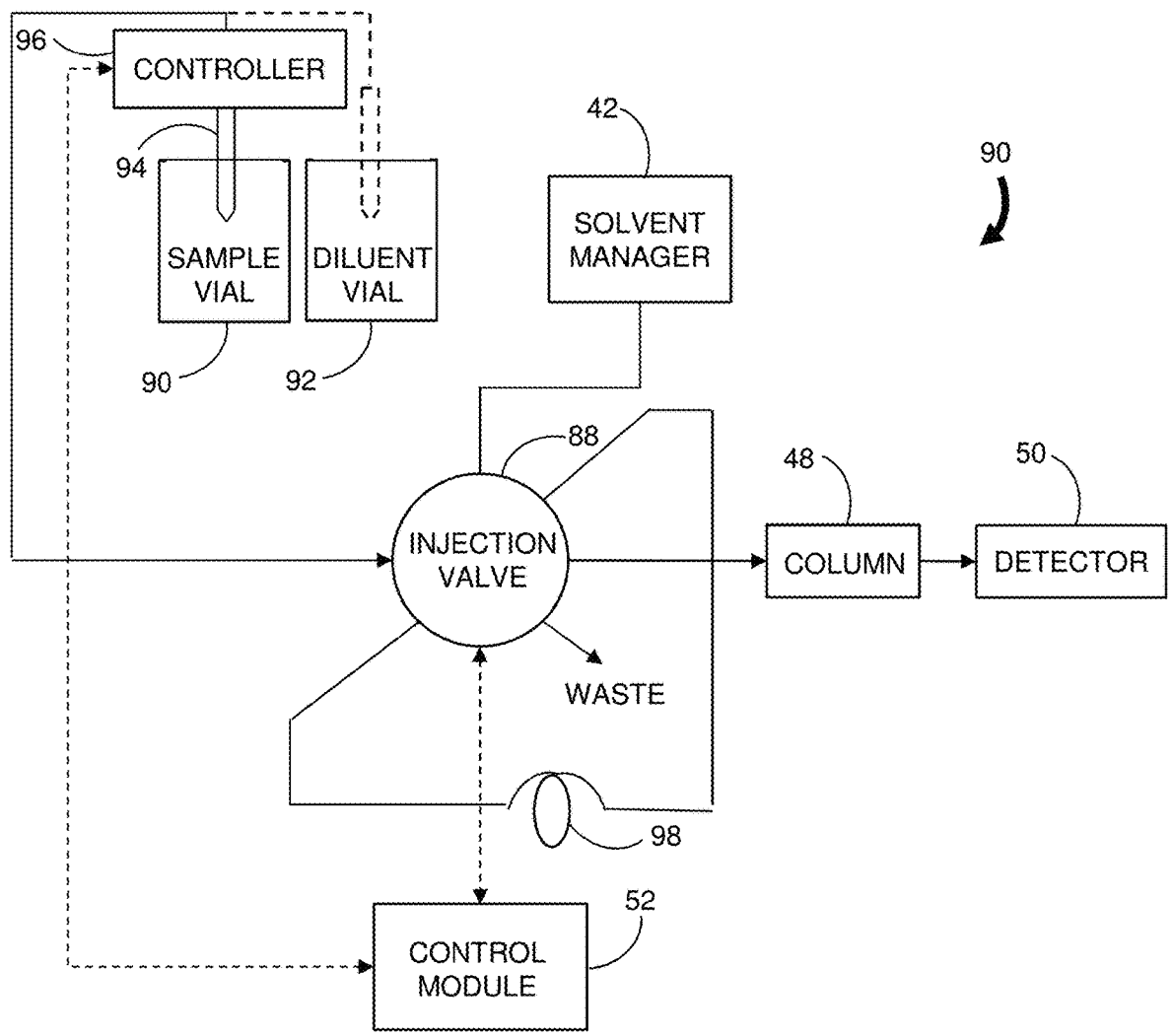
FIG. 13 is a block diagram of an embodiment of a liquid chromatography system configured to practice the method of FIG. 12.

FIG. 12 is a flowchart representation of an embodiment of a method 200 for diluting a sample for a chromatography system and FIG. 13 is a block diagram of an embodiment of a LC system 90 configured to practice the method 200. Components similar to those shown in the system 40 of FIG. 6 are indicated by similar reference numbers. In this embodiment the sample is obtained from a sample source, or sample vial, 90 and the diluent is obtained from a diluent source, or diluent vial, 92 using a sample needle 94. A sample needle controller 96 is in communication with the control module 52 which issues a control signal or commands to move the sample needle 94 into and out from the sample and diluent vials 90 and 92, and to acquire certain volumes of sample and diluent from the corresponding vials.

According to the method 200, the sample needle 94 is moved (step 210) to the sample vial 90 and a fluidic plug of an incremental volume $V_S$ of sample is acquired (step 220). The sample needle 94 is withdrawn from the sample vial 90 and moved (step 230) to the diluent vial 92 where a fluidic plug of an incremental volume $V_D$ of diluent is acquired (step 240). Steps 210 to 240 are repeated so that the sample needle 94 is moved in an alternating manner to the sample vial 90 and then the diluent vial 92 so that a stack (or series) of alternating sample fluidic plugs and diluent fluidic plugs are acquired until (as determined by step 250) the stack contains a total volume of sample. The sample is therefore diluted in a similar manner to that described above with respect to the method 100 of FIG. 4 except that the stack is formed separate from the flow of mobile phase in the chromatography system. The method 200 achieves an effective sample dilution according to the ratio $$(V_S+V_D)/V_S$$

By way of examples, sample managers having a sample needle that can be controlled to achieve an automated performance of the sample needle operation described above include the Alliance® 2695 Sample Manger and the Acquity® FTN, both available from Waters Corporation of Milford, Mass.

The stack of fluidic plugs can be inserted into the flow of mobile phase in different ways. For example, the flow path of the mobile phase can be reconfigured (step 260) by the injection valve 88 to flow through the sample needle 94. In this manner the stack of fluidic plugs is pushed out from the needle 94 toward the chromatographic column 48. In an alternative example, the stack of fluidic plugs can be loaded into a sample loop 98 coupled to the injection valve 88 to await injection into the mobile phase.

In various embodiments described above, the diluted sample is formed from a series of alternating fluidic plugs of sample and diluent, either at the location of the injection by cycling an injection valve or by loading the fluidic plugs into a sample needle in an alternating manner from a source of sample and a source of diluent. Alternatively, a diluted sample without discrete fluidic plugs can be created and then delivered to a sample loop coupled to the injection valve to await injection into the LC system flow, as described below.

Figure 14:
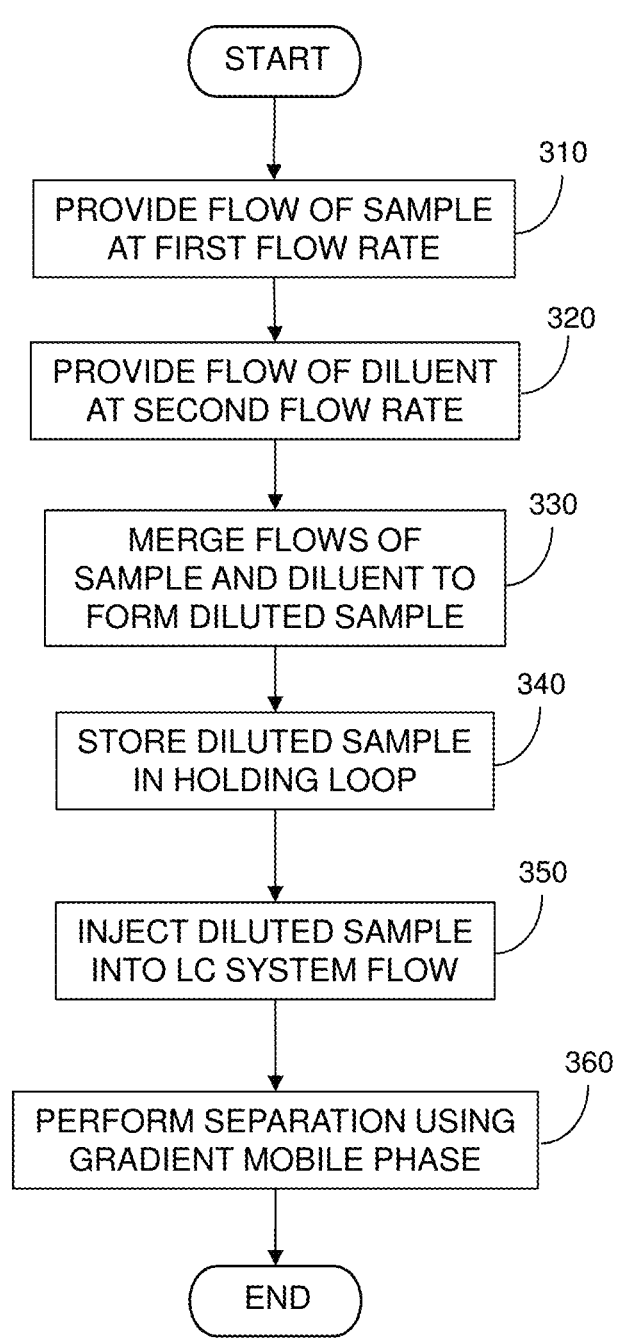
FIG. 14 is a flowchart representation of an embodiment of a method for injecting a diluted sample into a chromatographic system flow.
Figure 15:
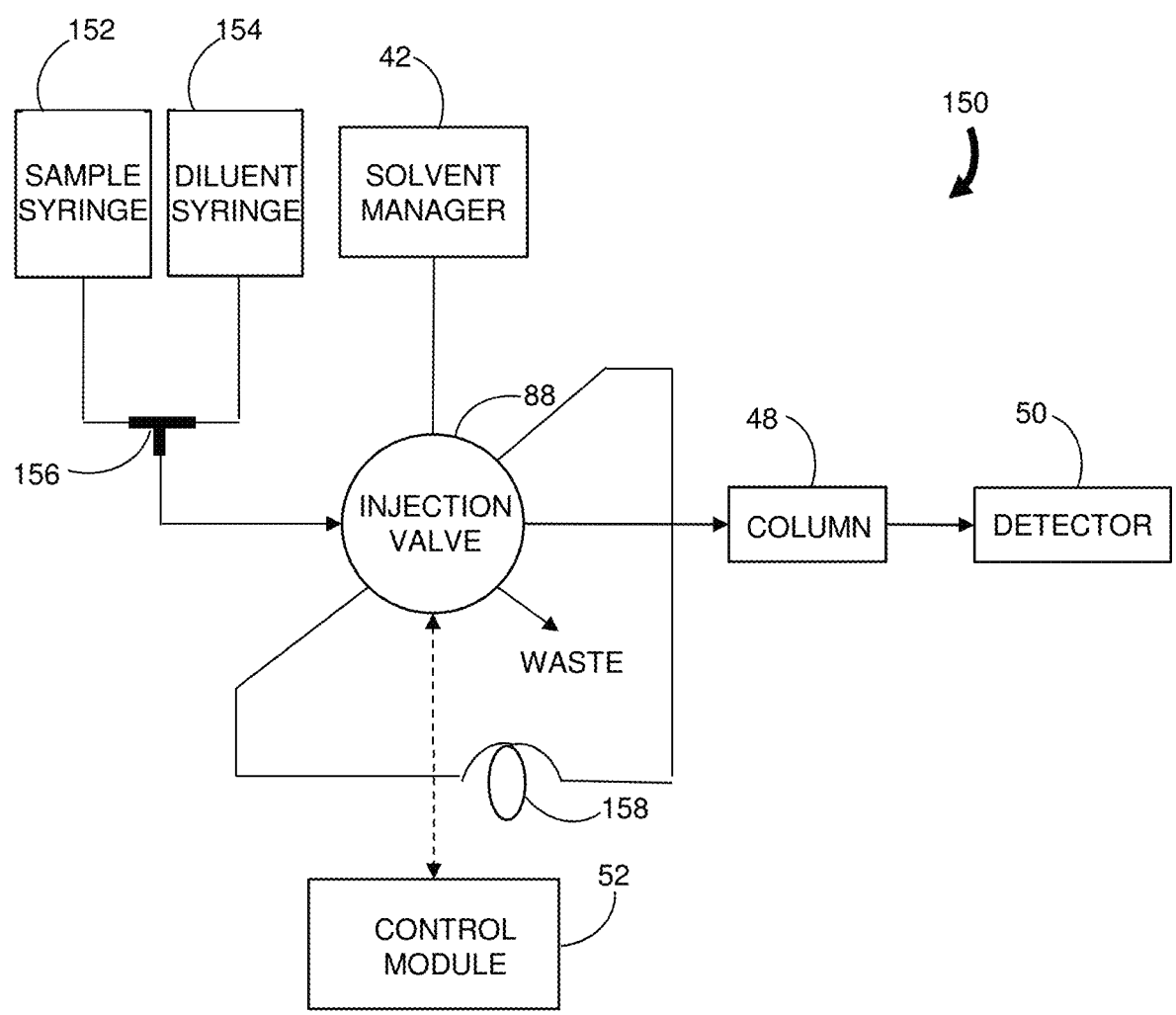
FIG. 15 is a block diagram of an embodiment of a liquid chromatography system configured to practice the method of FIG. 14.

FIG. 14 is a flowchart representation of an embodiment of a method 300 for injecting a diluted sample into a chromatographic system flow and FIG. 15 is a block diagram of an embodiment of a LC system 150 configured to practice the method 200. The LC system 150 includes components similar to the LC system 40 of FIG. 6; however, there is no direct supply of the sample to the injection valve 88. Instead, a sample syringe 152 and a diluent syringe 154 are coupled to the two inlets of a fluidic tee (combiner) 156 and the outlet of the fluidic tee 156 is coupled to a port on the injection valve 88. In addition, a holding element, shown here as a holding loop 158, is provided to store the diluted sample prior to injection. According to the method 300, the sample syringe 152 provides (step 310) a flow of sample to be diluted at a first flow rate $F_S$ and the diluent syringe 154 provides (step 320) a flow of diluent at a second flow rate $F_D$. The two flows are merged (step 330) at the fluidic tee 156 to form a diluted sample which flows to and is stored (step 340) in a holding loop 158 coupled to ports of the injection valve 88 to await injection. Typically, the holding loop 158 will have a substantially larger volume than a conventional sample loop to accommodate the substantially larger volume of the diluted sample. The diluted sample may either partially fill or totally fill the volume of the holding loop 158 under low pressure with any liquid displaced from the loop 158 flowing to waste. In an alternative embodiment, the holding element is a trap column that may be used in place of the holding loop 158.

The method 300 achieves a sample dilution according to the ratio $$(F_S+F_D)/F_S$$

The sample dilution occurs under low pressure relative to the chromatographic flow thereby eliminating a requirement for the syringes 152 and 154 to operate at high pressures while taking advantage of the ability of the syringes 152 and 154 to accurately deliver specific volumes of sample and diluent. Other benefits include reduced compressibility and a reduction in leaks due to the lower pressure operation.

Once the desired volume of diluted sample is stored in the holding loop 158, the diluted sample can be injected (step 350) into the LC system flow and the separation is performed (step 360) using a gradient mobile phase.

To avoid a large gradient delay, the LC system 150 can include two or more holding loops with each loop having a different volume. Thus a particular loop can be chosen according to the required diluted sample volume. This avoids the disadvantage of a single holding loop where the entire volume of the holding loop results in additional volume in the system flow path, resulting in a large gradient delay. For example, the selected holding loop may be determined according to a particular dilution ratio. By way of non-limiting examples, the holding loops can have a volume of a few microliters or less to a milliliter or more, enabling undiluted small volumes of sample to be injected as well as large volumes of diluted sample. Advantageously, the smaller volume loops avoid the delay that would otherwise occur at the beginning of the separation using a larger volume holding loop.

As an alternative to using multiple holding loops, a reverse flow injection may be performed to prevent introducing the full volume of the holding loop into the LC system flow. This technique involves flowing the diluted sample into a holding loop that may have a volume substantially greater than the volume of diluted sample being stored. To inject the volume of diluted sample without injecting the full volume of the holding loop, the valve may be configured to displace the liquid in the holding loop in a direction that is reversed from the flow direction used to load the loop. This allows the diluted sample to exit the holding loop from the same end through which it was originally loaded. After a sufficient time to ensure that the sample volume is displaced from the holding loop and injected, the valve is reconfigured to take the holding loop off the active flow path and the gradient mobile phase generated by high pressure solvent delivery system is directed to the column bypassing the holding loop volume.

It will be recognized that the syringes 152 and 154 can be operated in an alternating manner so that discrete fluidic plugs similar to those depicted in FIG. 5A are delivered to the holding loop 158. Unlike the continuous flow of sample and diluent described above, the flows of sample and diluent include discrete fluidic plugs of sample and diluent, respectively, and the merged flow exiting the fluidic tee 156 includes a time-interleaved combination of the sample and diluent fluidic plugs. In this configuration, the flow rates are proportional to the product of the rate at which the fluidic plugs are provided by the syringe and the volume of liquid in each fluidic plug. A mixer can be provided in the flow path of the merged fluid upstream from the injection valve 88 although the mixer may be omitted with fluidic plugs of sufficiently small volume. In addition or as an alternative to the mixer, the flow of discrete fluidic plugs of sample and diluent can be mixed by repeated back and forth passage of the flow through the holding loop. Thus, the volume of the holding loop should be greater than the volume defined by the alternating fluidic plugs of sample and diluent. The mixing efficiency increases with each additional back and forth passage. After each reversal of flow direction, it is preferable to wait several seconds before again reversing the flow direction to improve the mixing.

Unlike high pressure dilution where the diluent is generally a weak mobile phase, dilution achieved by operation of the two syringes has increased flexibility in terms of types of diluents. The syringe 152 or 154 can aspirate any user supplied diluent to use for sample dilution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable mediums having computer readable program code embodied thereon.

Any combination of one or more computer readable storage mediums may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. As used herein, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described above with reference to a flowchart illustration and block diagrams of methods, apparatus (systems) and computer program products according to embodiments of the invention. It will be understood that each block of the flowchart illustration and/or block diagrams, and combinations of blocks in the flowchart illustration and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been shown and described with reference to specific preferred embodiments, it should be understood by those skilled in the art that various changes in form and detail may be made therein without departing from the spirit and scope of the invention as defined by the following claims.

The invention claimed is:

1. A method for diluting a sample upon injection into a chromatographic system flow, comprising:
   a) injecting an incremental volume of a sample into a chromatographic system flow, the sample comprising at least one analyte dissolved in a solvent;
   b) providing an incremental volume of a mobile phase into the chromatographic system flow; and
   repeating steps a) and b) until a total volume of stored sample is injected into the chromatographic system flow, wherein a dilution ratio of the injected sample equals the sum of the incremental volumes of the sample and the mobile phase divided by the sum of the incremental volumes of the sample.

2. The method of claim 1 wherein steps a) and b) are performed by controlling an injection valve in communication with a sample loop and a source of the mobile phase.

3. The method of claim 2 further comprising loading the total volume of the sample into the sample loop prior to a first injection of the incremental volume of the sample into the chromatographic system flow.

4. The method of claim 2 wherein the incremental volume of the sample is proportional to an injection duration and wherein the incremental volume of the mobile phase is proportional to a time between consecutive injections of the incremental volume of the sample.

5. The method of claim 1 wherein the incremental volume of the sample is injected into the chromatographic system flow for a first duration and the incremental volume of the mobile phase is provided into the chromatographic system flow for a second duration.

6. The method of claim 5 wherein the dilution ratio of the injected sample equals the sum of the sum of the first and second durations divided by the sum of the first durations.

7. The method of claim 5 wherein the dilution ratio of the injected sample equals a sum of the first and second durations for a cycle of the injection valve divided by the first duration for the cycle of the injection valve.

8. The method of claim 1 further comprising providing a gradient mobile phase into the chromatographic system flow after the total volume of stored sample is injected into the chromatographic system flow.

9. An apparatus for diluting a chromatographic sample comprising:
   an injection valve configured to receive a flow of a mobile phase and a total volume of a sample, the injection valve further configured to provide one of the mobile phase and the sample to a system flow according to a state of the injection valve; and
   a control module in communication with the injection valve, the control module generating a signal to control the state of the injection valve in one of a first state in which the sample is injected into the system flow and a second state in which the mobile phase is provided to the system flow, the control module further controlling a duration in the first state wherein an incremental volume of the sample is injected into the system flow and a duration in the second state during which an incremental volume of the mobile phase is provided into the system flow and to repeatedly switch between the first and second states to thereby generate a diluted sample upon injection.

10. The apparatus of claim 9 wherein a dilution ratio of the diluted sample equals a sum of the incremental volumes of the sample and mobile phase divided by a sum of the incremental volumes of the sample.

11. The apparatus of claim 9 wherein the dilution ratio of the diluted sample equals a sum of the durations in the first and second states for a cycle of the injection valve divided by a duration in the first state for the cycle of the injection valve.

12. The apparatus of claim 9 further comprising a mixer in fluidic communication with an output of the injection valve.

13. The apparatus of claim 9 further comprising a sample loop in fluidic communication with the injection valve and configured to hold the total volume of the sample.

* * * * *